No. 847,447.

PATENTED MAR. 19, 1907.

R. C. TEEL.
COTTON CHOPPER AND CULTIVATOR.
APPLICATION FILED MAY 22, 1906.

UNITED STATES PATENT OFFICE.

RICHARD C. TEEL, OF CLANTON, ALABAMA.

COTTON CHOPPER AND CULTIVATOR.

No. 847,447.　　　Specification of Letters Patent.　　　Patented March 19, 1907.

Application filed May 22, 1906. Serial No. 318,158.

*To all whom it may concern:*

Be it known that I, RICHARD C. TEEL, a citizen of the United States, residing at Clanton, in the county of Chilton and State of Alabama, have invented certain new and useful Improvements in Cotton Choppers and Cultivators, of which the following is a specification, reference being had therein to the accompanying drawing.

My invention relates to improvements in cotton choppers and cultivators, and consists in the novel features of construction, combination, and arrangement of devices hereinafter described and claimed.

The object of the invention is to provide a simple and practical machine of this character which as it is drawn through the field will first prepare the cotton for chopping, then chop it, and finally throw the earth back to the cotton.

Further objects and advantages of the invention, as well as the structural features by means of which they are attained, will be made clear by an examination of the following specification, taken in connection with the accompanying drawing, in which—

Figure 1 is a top plan view of my improved cotton chopper and cultivator. Fig. 2 is a side elevation of the same. Fig. 3 is a rear end elevation. Fig. 4 is a detail horizontal section showing the bearing for the front end of the hoe-shaft, and Fig. 5 is a detail vertical section taken on the plane indicated by the lines 5 5 in Fig. 1.

My improved cotton chopper and cultivator comprises a frame 1, formed, preferably, by bending a piece of metal to provide parallel side bars 2, a rear cross-bar 3, in which is formed a rearwardly-projecting loop 4 and converging forward portions 5, which latter have a draft-hook or the like 6 bolted between them. The front portions of the side bars 2 are connected by a front cross-bar 7, having its bent ends secured by bolts 8, which also connect the lower ends of handle-bars 9 to said side bars. The handles 9 are inclined upwardly and rearwardly and are connected together by a cross bar or brace 10 and to the loop portion 4 of the rear cross-bar 3 by inclined braces 11. The front cross-bar 7 is strengthened by a substantially U-shaped brace, which has its forwardly-extending parallel arms 13 secured to the converging portions 5 of the frame 1.

Upon the arms or bars 13 are pivoted at 14 curved legs 15, which have upon their lower ends circular scrapers 16 and upon their upper ends enlargements 17, formed with apertures, through any one of which may be passed a bolt 18 for securing one of the legs in an adjusted angular position. Similarly pivoted at 19 upon the rear portions of the side bars 2 are similar curved legs 20, which have upon their lower ends cultivator shovels or plows 21. The apertured enlargements 22 of these legs 20 are also adjustably secured upon the bars 2 by bolts 23, as clearly shown in Fig. 2.

The cotton is chopped by two hoe-blades 24 upon the curved ends of arms 25, which are adjustably secured, as shown at 26, upon a longitudinal shaft 27. This connection 26 is preferably effected by bolts and clip-plates, so that the hoe-carrying arms 25 may be adjusted longitudinally upon said shaft toward and from each other. The shaft 27 is disposed centrally and horizontally and has its forward end loosely journaled in a bearing 28 on the cross-bar 7, so that said shaft will have a slight oscillatory movement. The rear end of the shaft is journaled in a bearing 29, which is slidably mounted in the rear cross-bar 3 of the frame 1, said bearing 29 being in the form of a block having its rear face grooved to form upper and lower flanges 30, which engage the edges of said bar 3. Upon the rear portion of the shaft is a pinion 31, meshing with a gear 32 upon one face of a drive-wheel 36, which latter runs upon the ground and is journaled in the loop 4 of the cross-bar 3. The pinion is thrown into and out of mesh with its gear by shifting the bearing 29, and I accomplish this by swinging a hand-lever 37, which is pivoted at 38, upon a segmental bracket 39, projecting from the cross-bar 3. Said lever has its lower end pivoted to the bearing 29, and its upper end carries a pin or stud 40, adapted to be engaged with either one of two apertures 41 in the brace 10 for the purpose of holding said lever in an adjusted position.

The construction, operation, and advantages of the invention will be readily understood from the foregoing description, taken in connection with the accompanying drawing. It will be seen that when the machine is drawn through a cotton-field by a draft animal or animals its scrapers 16 will remove the dirt and rubbish from the cotton, thus preparing it for the rotary hoes, which latter may be adjusted both longitudinally toward and from each other and axially on the longitudinal shaft. After the cotton is chopped the covering cultivator-shovels throw the earth back upon the standing cotton, as will be readily understood. By adjusting the legs 15 and 20 the scrapers and shovels may be set to operate at any depth within the range of its adjustment, and by adjusting the hand-lever the hoes may be quickly thrown into or out of operation.

Various changes in the form, proportion, and the minor details of construction may be made without departing from the spirit or sacrificing any of the advantages of the invention as defined by the appended claims.

Having thus described my said invention, what I claim as new, and desire to secure by Letters Patent of the United States, is—

1. A machine of the character described comprising side bars, front and rear cross-bars, a ground-wheel, a gear carried by said wheel, a fixed bearing upon said front cross-bar, a transversely-slidable bearing upon said rear cross-bar, a longitudinally-extending shaft having its front and rear ends mounted for rotation in said bearings, a pinion fixed upon said shaft to mesh with said gear, a chopping-hoe upon said shaft, and means for moving said slidable bearing laterally upon said rear cross-bar to move said pinion into and out of mesh with said gear.

2. A machine of the character described comprising side bars, front and rear cross-bars, a ground-wheel, a gear carried by said wheel, a fixed bearing upon said front cross-bar, a transversely-slidable bearing upon said rear cross-bar, a longitudinally-extending shaft having its front and rear ends mounted for rotation in said bearings, a pinion fixed upon said shaft to mesh with said gear, a chopping-hoe upon said shaft, handles projecting upwardly and rearwardly from said side bars, a cross-brace connecting said handles, a lever for moving said slidable bearing laterally upon said rear cross-bar to shift said pinion into and out of mesh with said gear, and means upon said lever for engaging said cross-brace to hold said slidable bearing in an adjusted position.

3. A machine of the character described comprising a frame having side bars and front and rear cross-bars connecting said side bars, a ground-wheel, a gear carried by said wheel, a bearing fixed upon said front cross-bar, a bearing slidable upon said rear cross-bar and having flanges to engage the upper and lower edges of said rear cross-bar, a longitudinal shaft mounted for rotation in said bearings, a pinion upon said shaft to mesh with said gear, a chopping-hoe upon said shaft, handles projecting upwardly and rearwardly from said side bars, a cross-brace connecting said handles and formed with apertures, an operating-lever pivotally mounted upon said frame and loosely connected to said slidable bearing, and a pin carried by said lever to enter the apertures in said cross-brace.

4. A machine of the character described comprising a frame formed by bending a bar of metal to provide parallel side bars, a connecting rear cross-bar formed with a rearwardly-extending loop, and converging front ends, a draft connection secured between said converging front ends, a front cross-bar connecting said side bars, a ground-wheel journaled in the loop in said rear cross-bar, a gear carried by said wheel, a stationary bearing upon said front cross-bar, a horizontally-slidable bearing upon said rear cross-bar, a longitudinal shaft having its front and rear ends rotatably mounted in said bearings, a pinion upon said shaft to engage said gear, a chopping-hoe upon said shaft, handles upon said frame, and means for adjusting said slidable bearing to hold said pinion in or out of mesh with said gear.

5. A machine of the character described comprising a frame formed by bending a bar of metal to provide parallel side bars, a connecting rear cross-bar formed with a rearwardly-extending loop, and converging front ends, a draft connection secured between said converging front ends, a front cross-bar connecting said side bars, a ground wheel journaled in the loop in said rear cross-bar, a gear carried by said wheel, a stationary bearing upon said front cross-bar, a horizontally-slidable bearing upon said rear cross-bar, a longitudinal shaft having its front and rear ends rotatably mounted in said bearings, a pinion upon said shaft to engage said gear, a chopping-hoe upon said shaft, handles projecting upwardly and rearwardly from said side bars, a cross-brace connecting said handles and formed with apertures, angular braces connecting said handles and the loop in said rear cross-bar, and a pin upon said lever to enter the apertures in said cross-brace.

6. A machine of the character described comprising a frame formed by bending a bar of metal to provide parallel side bars, a connecting rear cross-bar formed with a rearwardly-extending loop, and converging front ends, a draft connection secured between said converging front ends, a front cross-bar connecting said side bars, a U-shaped bar having its parallel arms secured to the converging front ends of said frame and its connecting portion secured to said front cross-bar, angularly-adjustable legs upon the parallel arms of said U-shaped bar, cultivator-shovels upon said legs, angularly-adjustable legs upon said side bars, and cultivator-shovels upon the last-mentioned legs, handles projecting upwardly and rearwardly from said side bars, braces connecting said handles and the loop in said rear cross-bar.

7. A machine of the character described comprising a frame, a ground-wheel journaled therein, a gear carried by said wheel, a longitudinally-extending shaft, a stationary bearing for the front end of said shaft, a transversely-slidable bearing for the rear end of said shaft, a pinion fixed upon the rear portion of said shaft to mesh with said gear, and means for shifting said slidable bearing transversely or laterally to move said pinion into and out of mesh with said gear.

In testimony whereof I hereunto affix my signature in presence of two witnesses.

RICHARD C. TEEL.

Witnesses:
 ALLIE C. SMITH,
 W. P. HARRIS.